United States Patent
Paul

(10) Patent No.: US 10,982,791 B2
(45) Date of Patent: Apr. 20, 2021

(54) DISCHARGE TAP FOR LIQUID CONTAINERS

(71) Applicant: PROTECHNA S.A., Fribourg (CH)

(72) Inventor: Ulrich Paul, Ransbach-Baumbach (DE)

(73) Assignee: PROTECHNA S.A., Fribourg (CH)

( * ) Notice: Subject to any disclaimer, the term of this patent is extended or adjusted under 35 U.S.C. 154(b) by 0 days.

(21) Appl. No.: 16/066,359

(22) PCT Filed: Dec. 6, 2016

(86) PCT No.: PCT/EP2016/079910
§ 371 (c)(1),
(2) Date: Jun. 27, 2018

(87) PCT Pub. No.: WO2017/121543
PCT Pub. Date: Jul. 20, 2017

(65) Prior Publication Data
US 2019/0032813 A1    Jan. 31, 2019

(30) Foreign Application Priority Data
Jan. 11, 2016  (DE) .................... 10 2016 200 206.6

(51) Int. Cl.
*F16K 35/02* (2006.01)
*F16K 31/60* (2006.01)
(Continued)

(52) U.S. Cl.
CPC .......... *F16K 31/602* (2013.01); *B65D 77/067* (2013.01); *B67D 3/047* (2013.01);
(Continued)

(58) Field of Classification Search
CPC ...... F16K 35/025; F16K 1/18; F16K 27/0218; F16K 27/06; F16K 31/602; B65D 77/067; B67D 3/047; G05G 5/06
(Continued)

(56) References Cited

U.S. PATENT DOCUMENTS

| 557,943 | A | * | 4/1896 | Bayley et al. | ........ F16K 35/025 251/110 |
| 851,338 | A | * | 4/1907 | Barnhouse | ............ F16K 35/025 251/104 |

(Continued)

FOREIGN PATENT DOCUMENTS

| CA | 1169838 A | 6/1984 |
| CN | 2208133 | 9/1995 |

(Continued)

*Primary Examiner* — Kevin F Murphy
*Assistant Examiner* — Jonathan J Waddy
(74) *Attorney, Agent, or Firm* — King & Schickli, PLLC

(57) ABSTRACT

A discharge tap (10) for liquid containers, in particular for connecting to the outlet neck or the outlet opening of a transportation and storage container for liquids, having a tap housing (11) in which a valve body being pivotable around a valve axle by means of a handle (12) for opening and closing a flow cross section of an outlet tube (13) is arranged, said handle being provided with a handle stop and a housing dome of the tap housing being provided with a housing stop, said handle stop and said housing stop being able to be locked relatively to each other via a securing device (16) for securing the locking position, the securing device (16) comprising a stop bolt (17) being able to be displaceable between a bolting position and an unbolting position in a translatory manner in direction of the valve axle.

8 Claims, 5 Drawing Sheets

(51) Int. Cl.
  *B65D 77/06* (2006.01)
  *B67D 3/04* (2006.01)
  *F16K 27/06* (2006.01)
  *F16K 1/18* (2006.01)
  *F16K 27/02* (2006.01)

(52) U.S. Cl.
  CPC ............ *F16K 27/06* (2013.01); *F16K 35/025* (2013.01); *F16K 1/18* (2013.01); *F16K 27/0218* (2013.01)

(58) Field of Classification Search
  USPC ......................................... 251/101, 102, 110
  See application file for complete search history.

(56) References Cited

U.S. PATENT DOCUMENTS

| | | | | |
|---|---|---|---|---|
| 1,459,686 | A * | 6/1923 | O'Gorman | F16K 35/025 251/89 |
| 1,587,091 | A * | 6/1926 | Vanadia | F16K 35/025 251/104 |
| 1,655,473 | A * | 1/1928 | Mickaelson | F16K 35/025 251/103 |
| 1,689,657 | A * | 10/1928 | Wise | F16K 35/025 251/110 |
| 1,935,936 | A * | 11/1933 | Bodzioch | F16K 35/02 251/102 |
| 2,987,072 | A | 6/1961 | Muller et al. | |
| 3,858,843 | A * | 1/1975 | Hartmann | F16K 35/00 251/99 |
| 4,274,445 | A * | 6/1981 | Cooper | F16K 11/163 137/601.02 |
| 4,848,724 | A * | 7/1989 | Pettinaroli | F16K 5/0647 251/95 |
| 5,058,622 | A * | 10/1991 | Chitty, Jr. | F16K 35/06 137/385 |
| 5,188,335 | A * | 2/1993 | Pettinaroli | F16K 35/06 137/315.18 |
| 5,365,759 | A * | 11/1994 | Bonomi | F16K 35/06 137/385 |
| 5,772,177 | A * | 6/1998 | Holloway | F16K 35/025 251/104 |
| 6,119,494 | A * | 9/2000 | Whitfield | F16K 31/602 137/385 |
| 2015/0144208 | A1* | 5/2015 | Caccavo | F16K 17/30 137/512.2 |
| 2017/0235328 | A1* | 8/2017 | Swayne | G05G 1/10 74/532 |
| 2017/0241565 | A1* | 8/2017 | Frische-Mouri | F16K 35/025 |
| 2020/0300382 | A1* | 9/2020 | Paul | B67D 3/047 |

FOREIGN PATENT DOCUMENTS

| | | |
|---|---|---|
| CN | 1495104 A | 5/2004 |
| CN | 1600653 A | 3/2005 |
| CN | 102072341 A | 5/2011 |
| CN | 102245311 A | 11/2011 |
| EP | 0209667 A1 | 1/1987 |
| EP | 0949159 A2 | 10/1999 |
| EP | 1106565 A1 | 6/2001 |
| EP | 1547967 A1 | 6/2005 |
| JP | 3023631 | 4/1996 |

* cited by examiner

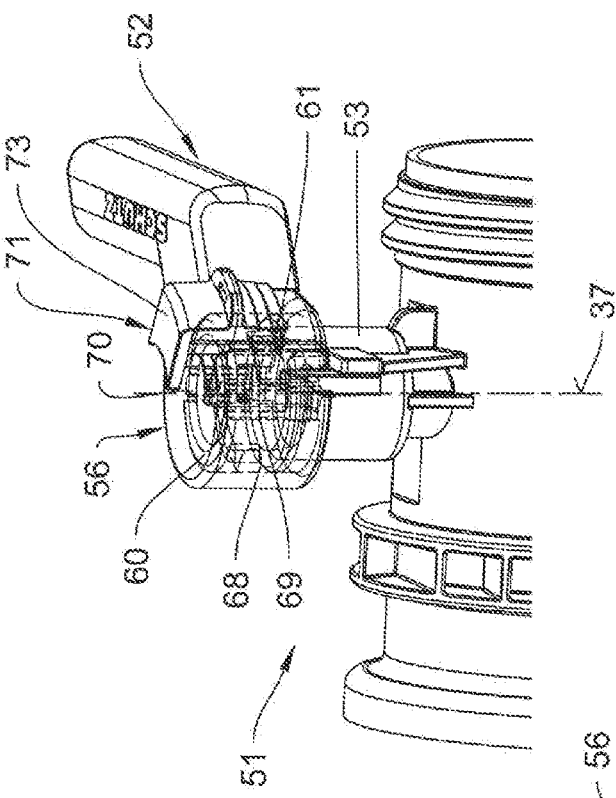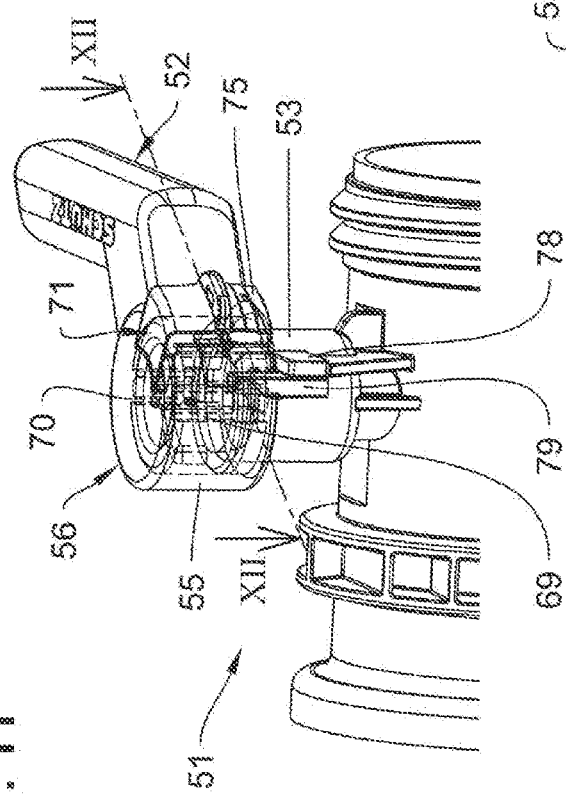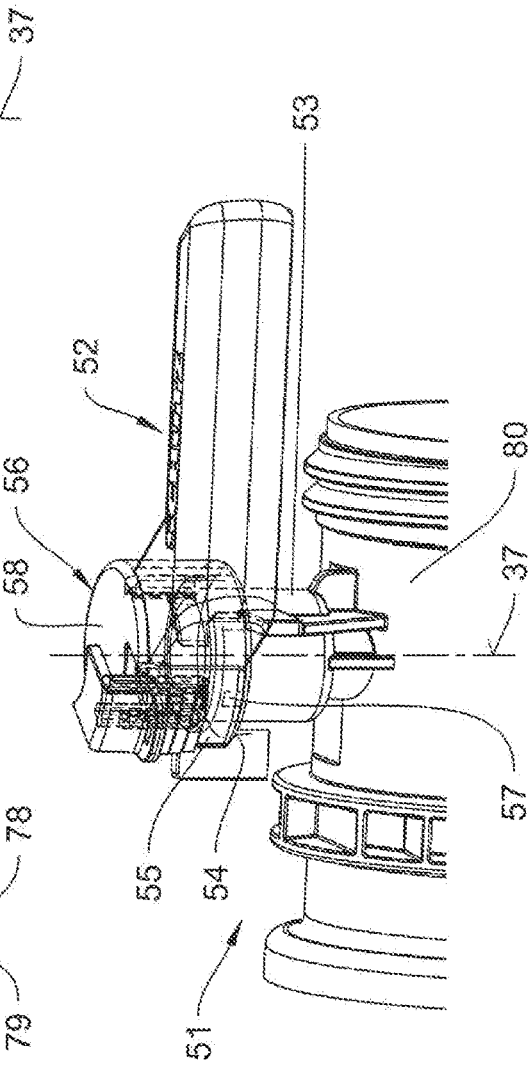

DISCHARGE TAP FOR LIQUID CONTAINERS

FIELD OF THE INVENTION

The invention at hand relates to a discharge tap for liquid containers, in particular for connecting to the outlet neck or the outlet opening of a transportation and storage container for liquids, having a tap housing in which a valve body being pivotable around a valve axle by means of a handle for opening and closing a flow cross section of an outlet tube is arranged, a housing dome being formed at the outlet tube for mounting a valve shaft provided with the handle at its shaft end and extending out of the outlet tube, said handle being connected to the valve shaft in a torque-proof manner and being arranged on the shaft end with a hub part, said hub part being provided with a handle stop for defining a shut-off position of the valve body and the housing dome being provided with a housing stop, said handle stop and said housing stop being able to be locked relatively to each other via a securing device for securing the shut-off position.

BACKGROUND OF THE INVENTION

A discharge tap formed as a butterfly valve having a valve flap as a valve body is known from Document EP 1 106 565 A1, said discharge tap comprising a seal for forming a securing device for securing the relative arrangement between a handle stop formed at the handle and a housing stop formed at the tap housing, said seal simultaneously serving as a tamper-proof seal.

It is proposed in Document EP 1 547 967 A1 to provide a securing device for securing the handle from being unintentionally or maliciously displaced, said securing device being able to be formed as a seal or a mechanical lock, a tear-proof securing ring in particular being provided.

SUMMARY OF THE INVENTION

The known securing devices, which are to secure the handle of the butterfly valve at the valve housing in a relative arrangement corresponding to the shut-off position of the butterfly valve, are each suitable for one-time use only and have to be replaced with a new securing device after a first opening process of the butterfly valve, which requires removing or destroying the securing device, in order to ensure a closing position for the subsequent use of the liquid container, for example the further transport of an at least partially filled liquid container.

This in particular results in the necessity of the user of the container having to keep a corresponding replacing device at the ready on the one hand and of a renewed mounting of the securing device at the butterfly valve having to be carried out on the other hand. Due to the additional effort connected thereto, the risk of transporting at least partially filled liquid containers without the necessary securing of the discharge tap in its closing position arises in order to avoid said additional effort.

It is therefore the object of the invention at hand to propose a discharge tap having an improved securing device.

In order to attain this object, the discharge tap according to the invention comprises the features of claim 1.

According to the invention, the securing device comprises a stop bolt which is held at a guiding device arranged at the hub part and can be displaced between a locking position and an unlocking position in a translatory manner in direction of the valve axle by means of the guiding device, said stop bolt, when in the locking position, being positioned in an engagement arrangement with a first bolt stop and a second bolt stop for securing the shut-off position.

Due to the embodiment of the securing device according to the invention, in which the stop bolt is held at a guiding device in the locking position as well as in the unlocking position, the stop bolt also remains at the discharge tap when in the unlocking position so that the stop bolt can be reused following an unlocking process for displacing the valve body in its opening position in order for the stop bolt to be displaced in its locking position again after the valve body has been transferred to the shut-off position.

Neither replacing the securing device after having actuated the discharge tap nor a renewed mounting of the securing device or parts thereof after having actuated the discharge tap is necessary in the discharge tap according to the invention.

In a preferred embodiment, the guiding device is formed as a guiding web which is formed as an integral part of a circumferential wall of the hub part, a through opening being formed in a bottom wall in the transition from the guiding web to the bottom wall of the hub part in order to displace the stop bolt.

This enables the securing device at the discharge tap to be protected from forces acting externally on the one hand; on the other hand, the arrangement of the stop bolt protruding from the bottom wall of the hub part when in the unlocking position can serve as an optical marker for the unlocking position of the securing device.

Preferably, the stop bolt comprises a bolt leg for locking with the bolt stops and an actuating leg for handling the stop bolt, said bolt leg and said actuating leg being arranged essentially parallel to each other and being connected to each other at adjacent ends via a stop base, said stop base resting on an opening edge of the through opening formed by the upper end of the guiding web. The actuating leg formed independently of the bolt leg carrying out the actual locking function enables a simple handling and easy access to the stop bolt, regardless of whether the stop bolt is in its locking position or the unlocking position.

If the stop base comprises a surface arranged flush in a visible surface of the bottom wall of the hub part in the locking position of the stop bolt, a transition surface between the visible surface of the bottom wall of the hub part and the surface of the stop base can serve for applying a tamper-proof seal formed as a paper strip or foil strip, for example, said tamper-proof seal being destroyed when transferring the stop bolt to its unlocking position.

Preferably, the bolt leg comprises a bolt stop, which limits the movement of the stop bolt in the unlocking position and interacts with the hub part, for forming a retaining device.

In a preferred embodiment, the actuating leg of the stop bolt comprises an attaching device for attaching a tamper-proof seal.

Preferably, the securing device is formed as a through opening, which can in particular be formed in a radially protruding handling web of the actuating leg.

In a preferred embodiment, the first bolt stop is formed via the housing stop of the housing dome and the second bolt stop is formed via the handle stop, said housing stop being received between the handle stop and the stop bolt.

If the housing stop is formed via a stop tab arranged on the outside of the housing dome, said housing stop can be formed particularly massive.

In a further embodiment, the first bolt stop is formed via a housing stop formed at the housing dome and the second bolt stop is formed via a second housing stop formed at the housing dome, and the stop bolt is received between the housing stops. This embodiment enables both bolt stops being able to be realized at the housing dome.

If the first stop bolt is formed by a first axial end of an edge web formed circumferentially at the upper edge of the housing dome and the second bolt stop is formed by a second axial end of the edge web arranged opposite the first axial end, a particularly compact embodiment of the securing device is made possible.

BRIEF DESCRIPTION OF THE DRAWING FIGURES

In the following, preferred embodiments of the discharge tap are further described by way of the drawings.

In the figures,

FIG. 8 shows, in a further embodiment, a discharge tap in the opening position and having a securing device in the unlocking position;

FIG. 10 shows the discharge tap shown in FIG. 8 in the shut-off position having the securing device in the unlocking position;

FIG. 11 shows the discharge tap shown in FIG. 10 in the shut-off position having the securing device in the locking position;

DETAILED DESCRIPTION OF THE INVENTION

Figure 1:
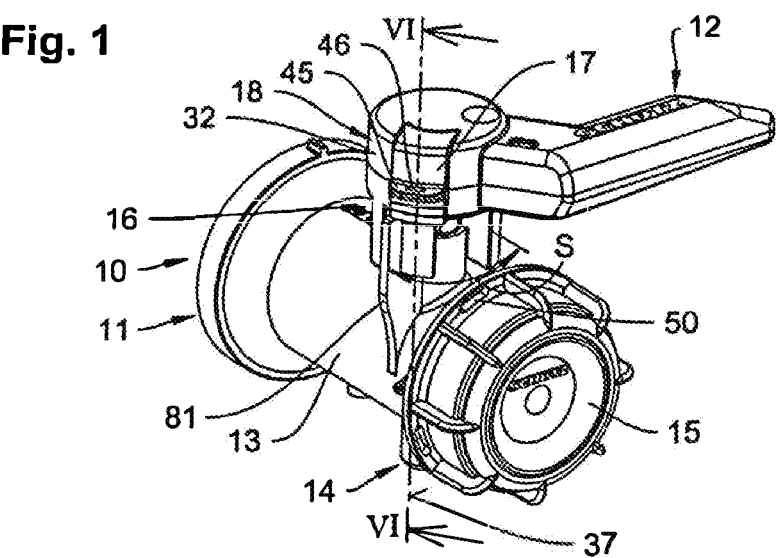
FIG. 1 shows, in a first embodiment, a discharge tap in the shut-off position and having a securing device in the locking position.

FIG. 1 shows a discharge tap 10 having a tap housing 11 and a handle 12 arranged at the tap housing 11, said handle 12 serving to actuate a valve body arranged in an outlet tube 13 and not further illustrated, said valve body being able to be displaced in an opening position and a shut-off position for opening and closing a flow cross section 36 (FIGS. 6, 7) of the outlet tube 13 by means of the handle 12.

Figure 2:
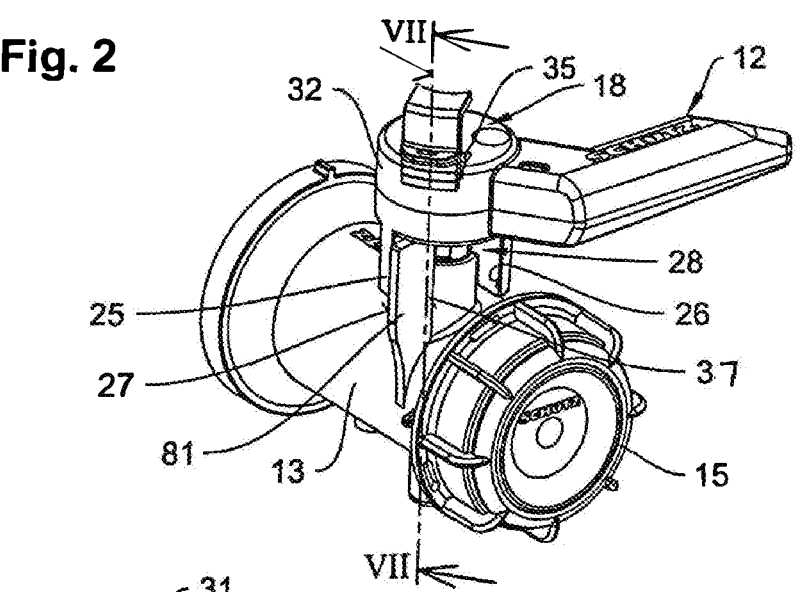
FIG. 2 shows the discharge tap shown in FIG. 1 in the shut-off position having the securing device in the unlocking position.

In the illustrations according to FIGS. 1 and 2, the outlet tube 13 of the discharge tap 10 is provided with a locking cap 15 at its outlet end 14. In doing so, the configuration of the discharge tap 10 shown in FIG. 1 corresponds to the state of the discharge tap 10 while transporting a liquid container provided with the discharge tap 10.

For securing the shut-off position of the valve body, a securing device 16 is provided at the discharge tap, said securing device 16 comprising a stop bolt 17 held at the handle 12 arranged at the guiding device formed as a guiding web 33 (FIGS. 6, 7) here.

Figure 6:
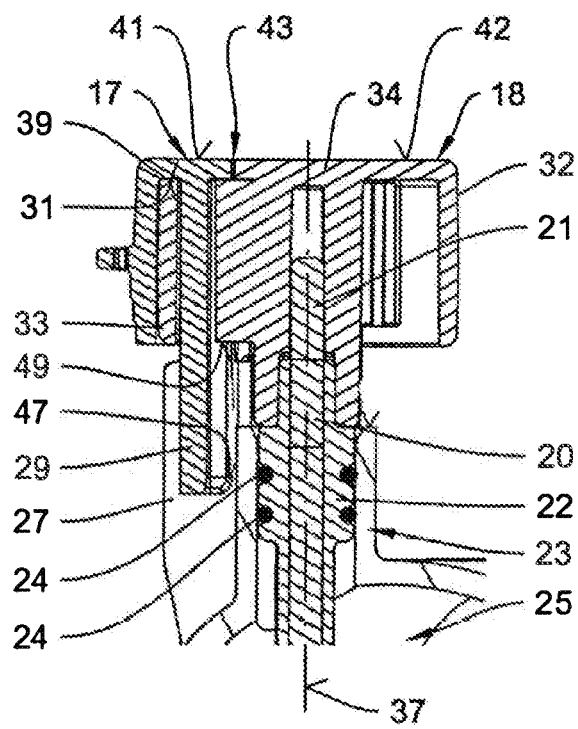
FIG. 6 shows a partial sectional view of the discharge tap shown in FIG. 1 cut along the line VI-VI in FIG. 1.
Figure 7:
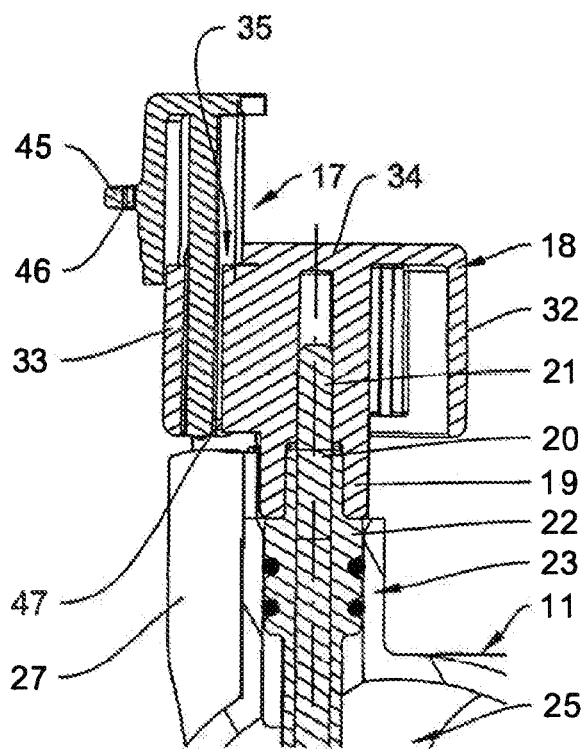
FIG. 7 shows a partial sectional view of the discharge tap shown in FIG. 2 cut along the line VII-VII.

As shown in FIGS. 1 and 2, the stop bolt 17 is arranged at a hub part 18 of the handle 12, said hub part 18, as shown in FIGS. 6 and 7, being formed like a cap and being placed on an upper shaft end 21 of a valve shaft 20 with a hub sleeve 19 for transmitting a turning moment from the handle 12 to the valve shaft 20, at the lower end of which the valve body, not further illustrated, is located. The valve shaft 20 is mounted in a housing dome 23 formed at the tap housing 11 with a mounting collar 22 and is sealed with respect to a flow cross section 36 (FIG. 6) of the outlet tube 13 by means of sealing rings 24 arranged at the mounting collar 22.

As in particular FIG. 2 shows, the hub part 18 of the handle 12 of the discharge tap 10 comprises two handle stops 25, 26 formed in a circumferential wall 32 of the hub part 18, said handle stops 25, 26 limiting a turning movement of the handle 12 around pivoting axis 37 defined by the valve shaft 20. In FIGS. 1 and 2, in which the discharge tap 10 is illustrated in the shut-off position, the handle stop 25, shown on the left-hand side in FIGS. 1 and 2 in each case, is in a stop position against a housing stop 27 formed at a stop tab 81 at the tap housing 11. The handle stop 26, shown on the right-hand side in FIGS. 1 and 2 in each case and defining an opening position of the valve body in a stop position against a housing stop 27 also formed at the stop tab 81, is spaced from the handle stop 25 via a recess 28 in the circumferential wall 32 of the hub part 18 so that a regulating distance s is enabled within the recess 28.

Figure 3:
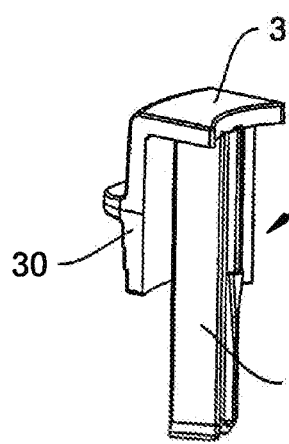
FIG. 3 shows a stop bolt of the securing device in an isometric view.
Figure 4:
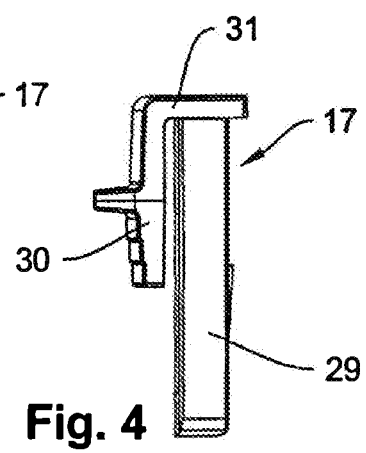
FIG. 4 shows the stop bolt shown in FIG. 3 in a lateral view.
Figure 5:
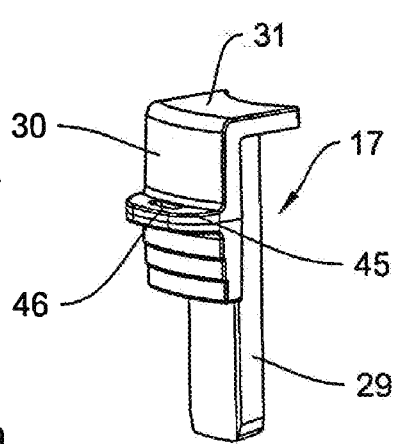
FIG. 5 shows the stop bolt shown in FIG. 3 in a further isometric view.

As shown in FIGS. 3 to 5, the stop bolt 17 comprises a bolt leg 29 as well as an actuating leg 30, extending essentially parallel to the bolt leg 29, for handling the stop bolt 17 and a stop base 31 connecting the bolt leg 29 to the actuating leg 30.

For connecting the stop bolt 17 to the hub part 18 of the handle 12, the guiding web 33, as shown in FIGS. 6 and 7, is formed integrally in the circumferential wall 32 of the hub part 18, the stop bolt 17 being able to be slid onto said guiding web 33 via a through opening 35 (FIG. 2) formed in a bottom wall 34 of the hub part 18 adjacent to the guiding web 33.

FIGS. 2 and 7 show the stop bolt 17 in its unlocking position in which the stop bolt 17 is inserted so far into the bottom wall 34 of the hub part 18 with the bolt leg 29 that a covering is not yet formed between the bolt leg 29 and the housing stop 27, meaning the handle 12 can be pivoted around the pivoting axis 37, so that the right handle stop 26 stops in a stop position against the housing stop 27 for transferring the valve body to an opening position when pivoting the handle 12 around the regulating distances.

As can be seen in particular in FIG. 1, the stop bolt 17 is provided with a handling web 45 at its actuating leg 30, said handling web 45 comprising a through opening 46 which, in connection with a further through opening 50 provided at a circumferential edge of the locking cap 15, enables arranging a tamper-proof seal formed as a sealing wire for example to the discharge tap 10 in such a manner that displacing the stop bolt 17 in its unlocking position shown in FIG. 2 is only possible after destroying the sealing wire.

For displacing the stop bolt 17 from the unlocking position shown in FIGS. 2 and 7 to the locking position shown in FIGS. 1 and 6, the stop bolt 17 is inserted further into the through opening 35 parallel to the pivoting axis 37 until the stop base 31 rests against an opening edge 39 of the through opening 35 formed by the upper end of the guiding web 33. In the locking position, a covering, shown in particular in FIG. 6, is realized between the housing stop 27 and the bolt leg 29 in such a manner that the housing stop 27 formed by the stop tab 81 is received between the handle stop 25 and the bolt leg 29 of the stop bolt 17 in the shut-off position shown in FIG. 1 and that the stop bolt 17 forms the securing device together with the handle stop 25 and the housing stop 27 and that pivoting the handle 12 around the pivoting axis 37 is no longer possible in the opening position.

As shown in particular in FIG. 6, a surface 41 of the stop base is aligned flush with a visible surface 42 of the hub part 18 of the handle 12 in the locking position so that a flat seal surface 43 is formed in the transition from the surface 41 to the visible surface 42, said seal surface 43 being able to be used for applying a seal foil or a seal strip.

A synopsis of FIGS. 6 and 7 shows that displacing the stop bolt 17 from the locking position shown in FIG. 6 to the defined unlocking position shown in FIG. 7 can be realized without the stop bolt 17 disengaging from the guiding device formed by the guiding web 33. For defining the unlocking position as well as for securely arranging the stop bolt 17 to the hub part 18 of the handle 12, a bolt stop 47 is formed at the bolt leg 29 for forming a retaining device, said bolt stop 47 abutting against a lower side 49 of the hub part 18.

In FIG. 8, a discharge tap 51 is shown in a further embodiment comprising a tap housing 80 having a handle 52 according to the discharge tap 10, said handle 52 being arranged on a housing dome 53.

Figure 9:
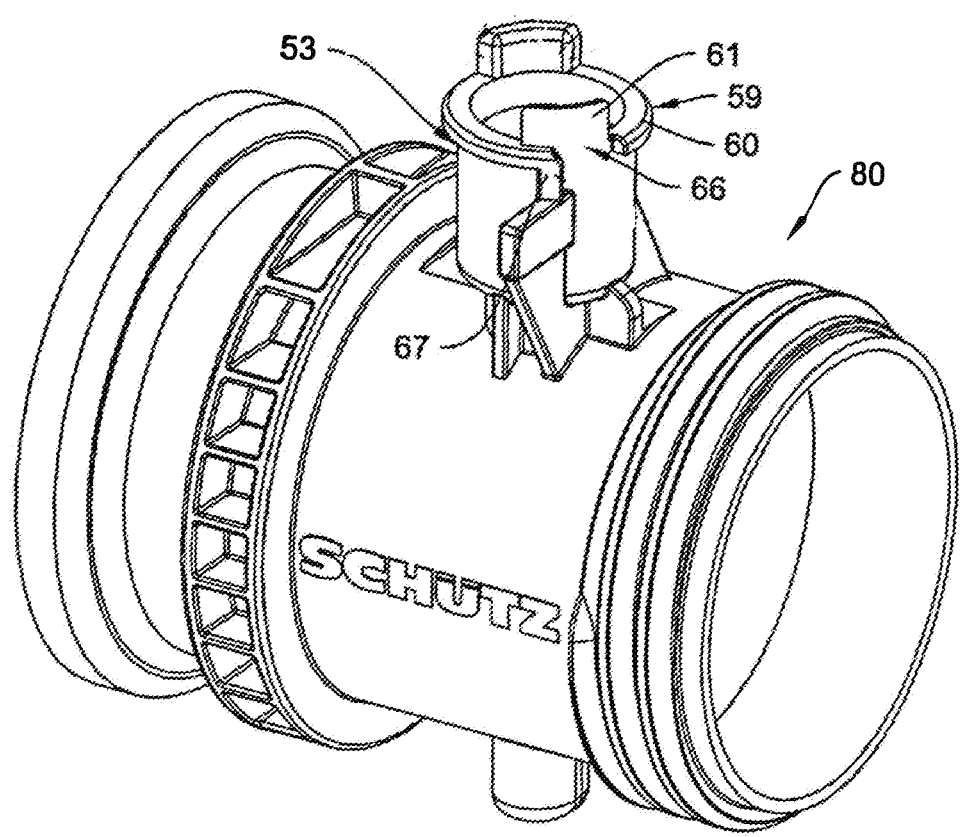
FIG. 9 shows a tap housing of the discharge tap shown in FIG. 8.

In contrast to the handle 52, which is arranged on the housing dome 23 of the discharge tap 10 in such a manner that the hub sleeve 19 of the handle 12 is directly connected to the mounting collar 22 of the valve shaft 20 as shown in particular in FIG. 7, securing the handle 52 to the housing dome 53 is realized in such a manner that locking lugs 57 protruding radially inward and facing each other diametrically at a lower edge 54 of a circumferential wall 55 of a hub part 56 of the handle 52 are arranged, said locking lugs 57 engaging behind an edge web 60, shown in particular in FIG. 9, formed at the upper edge 59 of the housing dome 53 in an axial joining process for mounting the handle 52 in the direction of the pivoting axis 37, a valve shaft, not shown in FIG. 8, being integrally connected to a bottom wall 58 of the handle 52. The handle 52 and the valve shaft therefore form an integral mounting unit in the discharge tap 51.

As in particular shown in FIG. 9, the housing dome 53 shows two housing stops 61, 62 facing each other diametrically and protruding over the upper edge 59 as well as ends 67, 72 of the edge web 60 facing each other axially via an edge web recess 66, said edge web 60 forming bolt stops.

As shown in FIG. 10, the handle 52 comprises two handle stops 69, 70 facing each other diametrically on an inner side 68 of the hub part 56, said handle stops 69, 70 enabling two stop positions when pivoting the handle 52 around the pivoting axis 37, the handle stops 69, 70 abutting against each of the housing stops 61, 62 shown in particularly in FIG. 9 in said stop positions.

As shown in FIG. 10, the shut-off position of the discharge tap 51 is defined via the stop of the handle stop 69 against the housing stop 61 and via the stop of the handle stop 70 against the housing stop 62. In the shut-off position of the discharge tap 51 shown in FIG. 10, there is a stop bolt 71 arranged at the handle 52, said stop bolt 71 being retained at a guiding web 33 (FIG. 7) in the circumferential wall 55 of the handle 52 corresponding to the stop bolt 17 of the locking device, namely in its unlocking position in which a stop base 73 of the stop bolt 71, which connects a bolt leg 74 shown in particular in FIG. 12 to an actuating leg 75, is arranged above the bottom wall 58 of the hub part 56 of the handle 52.

Figure 12:
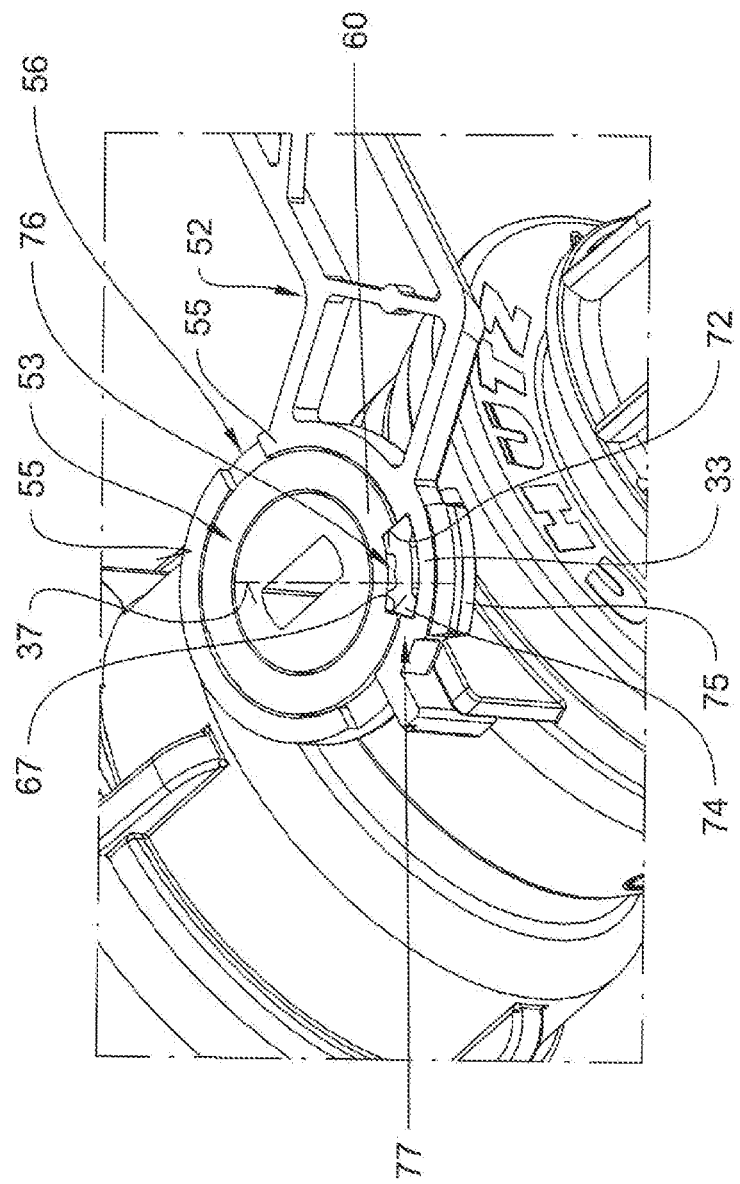
FIG. 12 shows a cross-sectional view of the discharge tap shown in FIG. 11 cut according to the line XII-XII in FIG. 11.

The stop bolt 71 can be displaced from the unlocking position shown in FIG. 10 to its locking position shown in FIGS. 11 and 12 for securing the shut-off position of the discharge tap 51, the bolt leg 74 being displaced downward to an interspace 76 formed between the housing dome 53 and the circumferential wall 55 of the hub part 56 of the handle 52.

The bolt leg 74 of the stop bolt 71 forms a securing device 77 together with the axial ends 67, 72 of the edge web 60 forming the bolt stops in this locking position as seen in FIG. 12, said securing device 77 effectively blocking the handle 52 from turning in both directions around the pivoting axis 37.

As a comparison between FIGS. 1 and 11 shows, the embodiment of the bolt stops interacting with the bolt leg 74 as axial ends 67, 72 of the edge overlap 60 enables a comparatively short embodiment of the bolt legs 74 so that the bolt leg 74 and the actuating leg 75 are realized having essentially the same length and do not protrude the hub part 56 or the lower edge 54 of the circumferential wall 55 of the hub part 56, respectively, in a downward direction in the case of the stop bolt 71.

As FIG. 11 shows, the housing dome 53 of the discharge tap 51 as well as the hub part 56 of the handle 52 are each provided with a display tab 78, 79 protruding radially downward which are in a relative arrangement partially covering each other and directly adjacent to each other in the shut-off position of the discharge tap 52. In doing so, the display tabs 78, 79 first of all serve for an easily identifiable display of the shut-off position of the discharge tap on the outside and in particular do not play a part in making the embodiment work.

Due to their comparatively massive embodiment, the display tabs 78, 79 still enable realizing an additional mechanical block which prevents the handle 52 from being able to be pivoted beyond the shut-off position shown in FIG. 11 in a counterclockwise direction using excessive force which could lead to damage of the housing stops 61, 62 and the handle stops 69, 70.

The invention claimed is:

1. A discharge tap (10, 51) for liquid containers, for connecting to an outlet neck or an outlet opening of a transportation and storage container for liquids, having a tap housing (11, 80) in which a valve body being pivotable around a valve axis by means of a handle (12, 52) for opening and closing a flow cross section of an outlet tube (13) is arranged, a housing dome (23, 53) being formed at the outlet tube for mounting a valve shaft (20) provided with the handle at its shaft end (21) and extending out of the outlet tube, said handle being connected to the valve shaft in a torque-proof manner and being arranged on the shaft end with a hub part (18, 56), said hub part being provided with a handle stop (25, 69) for defining a shut-off position of the valve body and the housing dome being provided with a housing stop (27, 61), said handle stop and said housing stop being able to be locked relatively to each other via a securing device (16, 77) for securing the shut-off position, characterized in that the securing device (16, 77) comprises a stop bolt (17, 71) which is held at a guiding device arranged at the hub part (18, 56) and can be displaced between a locking position and an unlocking position in a translatory manner in the direction that the valve axis extends by means of the guiding device, said stop bolt (17, 71), when in the locking position, being positioned in an engagement arrangement with a first bolt stop and a second bolt stop for securing the shut-off position;

wherein the guiding device is formed as a guiding web (33) which is formed as an integral part of a circumferential wall (32, 55) of the hub part (18, 56), a through opening (35) being formed in a bottom wall of the hub part (34, 58) in the transition from said guiding web to the rest of the hub part in order to guide the stop bolt (17, 71), and the stop bolt (17, 71) comprises a bolt leg (29, 74) for locking with the bolt stops and an actuating leg (30, 75) for handling the stop bolt, said bolt leg and said actuating leg being arranged parallel to each other and being connected to each other at adjacent ends via a stop base (31, 73), said stop base is configured to reset on an opening edge (39) of the through opening (35) formed in a bottom end of the guiding web (33).

2. The discharge tap according to claim 1, characterized in that the stop base (31, 73) comprises a surface (41) arranged flush with a visible surface (42) of the bottom wall (34, 58) of the hub part (18, 56) when in the locking position of the stop bolt (17, 71).

3. The discharge tap according to claim 1, characterized in that the bolt leg (29) comprises a bolt stop (47), which limits the displacement of the stop bolt (17) into the unlocking position and interacts with the hub part (18), for forming a retaining device.

4. The discharge tap according to claim 1, characterized in that the actuating leg (30) of the stop bolt (17) comprises an attaching device.

5. The discharge tap according to claim 4, characterized in that the attaching device is formed as a through opening (46).

6. The discharge tap according to claim 5, characterized in that the through opening (46) formed on the stop bolt (17) is formed in a radially protruding handling web (45) of the actuating leg (30).

7. The discharge tap according to claim 1, characterized in that the first bolt stop is formed by the housing stop (27) of the housing dome (23) and the second bolt stop is formed by the handle stop (25), said housing stop (27) being received between the handle stop (25) and the stop bolt (17).

8. The discharge tap according to claim 7, characterized in that the housing stop (27) is formed by a stop tab (81) arranged on the outside of the housing dome (23).

* * * * *

UNITED STATES PATENT AND TRADEMARK OFFICE
CERTIFICATE OF CORRECTION

| | | |
|---|---|---|
| PATENT NO. | : 10,982,791 B2 | Page 1 of 1 |
| APPLICATION NO. | : 16/066359 | |
| DATED | : April 20, 2021 | |
| INVENTOR(S) | : Ulrich Paul | |

It is certified that error appears in the above-identified patent and that said Letters Patent is hereby corrected as shown below:

In the Claims

Column 7, Claim 1, Line 14:
Please replace reset with --- rest ---

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*